United States Patent [19]

Kusters et al.

[11] Patent Number: 5,342,637
[45] Date of Patent: Aug. 30, 1994

[54] METHOD FOR CONDITIONING THE ATMOSPHERE IN A STORAGE CHAMBER FOR ORGANIC HARVESTED PRODUCE

[75] Inventors: Arnoldus P. M. Kusters, Etten Leur; Johannes M. De Bont, Oosterhout, both of Netherlands

[73] Assignee: Delair Droogtechniek en Luchtbehandeling B.V., An Etten Leur, Netherlands

[21] Appl. No.: 2,403

[22] Filed: Jan. 8, 1993

[30] Foreign Application Priority Data

Jan. 10, 1992 [NL] Netherlands ............................ 9200039

[51] Int. Cl.$^5$ .............................................. A23B 7/00
[52] U.S. Cl. ...................................... 426/312; 426/419
[58] Field of Search ................ 426/419, 312; 99/474; 55/16, 158

[56] References Cited

U.S. PATENT DOCUMENTS

| 4,740,378 | 4/1988 | Jameson | 426/419 |
| 5,156,009 | 10/1992 | Woodruff | 426/419 |

FOREIGN PATENT DOCUMENTS

| 88308713.2 | 9/1988 | European Pat. Off. |
| 90402214.2 | 8/1990 | European Pat. Off. |
| 1590579 | 4/1970 | France |
| 8202508 | 2/1982 | France |
| 1174366 | 10/1989 | Japan |

OTHER PUBLICATIONS

Japanese Publication No. JP1023846 published Jan. 26, 1989.
Japanese Publication No. JP2200144 published Aug. 8, 1990.

Primary Examiner—George Yeung
Attorney, Agent, or Firm—Bachman & LaPointe

[57] ABSTRACT

The invention relates to a method for conditioning the atmosphere in a storage chamber for organic harvested produce, characterized in that the storage chamber is allowed to form part of a system composed of the relevant storage chamber (1), at least two, and preferably three, gas separation modules (2), (3) and (4), which are located downstream of one another and are provided with $N_2/O_2$ separation membranes, at least one compressor (5) and at least one control valve (6), the compressor drawing in three streams (F1), (F2) and (F3), the first separation module yielding a permeate, which is removed from the system as stream (F4), and a retentate, which is fed to the second separation module, the second separation module yielding a retentate, which is fed to the third separation module, and a permeate, which is fed together with the permeate from the third separation module as stream to the compressor, and the retentate from the third separation module is fed via the control valve to the storage cheer.

8 Claims, 2 Drawing Sheets

METHOD FOR CONDITIONING THE ATMOSPHERE IN A STORAGE CHAMBER FOR ORGANIC HARVESTED PRODUCE

The invention relates to a method and an installation for conditioning the atmosphere in a storage chamber or storage cell for organic harvested produce, such as apples, pears, potatoes, flowers, cereals and the like.

INTRODUCTION

For all storage methods relating to organic harvested produce it is considered essential that the loss in quality of the stored products in question is kept as low as possible during storage. Therefore, it is important that ageing, microbiological or physiological decay, loss of moisture and damage to the stored product in question are prevented as far as possible. In order to achieve the abovementioned aim, methods which relate to conditioning of the atmosphere in the chamber in which the harvested produce is stored are disclosed in the prior art. One of these methods for conditioning the atmosphere in a storage chamber comprises flushing the storage chamber with nitrogen, by which means the oxygen is driven out of the storage cheer. However, this method has the disadvantage that, as a result of the lack of oxygen in the atmosphere, anaerobic bacteria can become active, as a result of which the quality of the stored product can be drastically reduced. For example, in the case of apples fermentation occurs, which leads to a product unacceptable to the consumer. Another storage method comprises cooling the organic produce stored in the storage chamber. This method generally has the disadvantage that the storage time is relatively short. In the case of apples this is only 2 to 3 months, after which the quality decreases to an unacceptable degree. Yet another method for conditioning the atmosphere in such storage chambers comprises lowering the oxygen content and, at the same time, raising the carbon dioxide content in the atmosphere prevailing in these chambers. However, this method entails the risk of the occurrence of the "$CO_2$ disease", as a result of which, once again, the quality of the stored product is lost.

It has been found that the disadvantages of the abovementioned known methods can be overcome if the storage chamber is allowed to form part of the system composed of the relevant storage chamber (1), at least two, and preferably three, gas separation modules (2), (3) and (4), which are located downstream of one another and are provided with $N_2/O_2$ separation membranes, at least one compressor (5) and at least one control valve (6), the compressor (5) drawing in three streams, i.e.
 (a) a stream (F1) which is drawn in from the storage cheer;
 (b) a quantity of outside air (F2) and
 (c) a recycle stream (F3), which is a combination of the permeate streams from the last two separation modules (3) and (4);
- the first separation module (2) yielding a permeate, which is removed from the system as stream (F4), and oxygen and carbon dioxide are thereby removed from the system until the oxygen concentration of the stream (F4) has reached the equilibrium value (21% by volume), and a retentate, which is fed to the second separation module (3),
- the second separation module (3) yielding a retentate, which is fed to the third separation module (4) - if this is present -, and a permeate, which is fed together with the permeate from the third separation module (4) as stream (F3) to the compressor (5), and
- the retentate from the third separation module (4) being fed via a control valve (6) to the storage cheer (1).

More particularly, at the start of the conditioning, according to the invention, of the atmosphere in the storage cheer (1) the oxygen concentration of stream (F1), which is drawn into the compressor (5), will be about 21% by volume (approximately equal to the oxygen concentration of the outside air). In this initial phase, the recycle stream (F3) produces an increase in the oxygen concentration of the feed to the compressor. The effect of the first separation module (2) with respect to oxygen removal is appreciably improved by this means. Oxygen removal from the first module (2) is determined by two factors, i.e. (a) the incoming oxygen concentration and (b) the flow rate, i.e. the air factor. A high flow rate results in an increase in the oxygen concentration which escapes as permeate. This oxygen-enriched air stream is indicated in FIG. 1 as stream (F4). The oxygen concentration of this air stream will be at 46% at the start of conditioning and gradually become lower during conditioning, depending on the concentration (F1). The amount which is separated off as oxygen-enriched permeate is equal to the quantity of outside air which the compressor (5) draws in as stream (F2). The storage chamber (1) will reach the lowest oxygen content when the oxygen concentration of the stream (F4) is equal to the oxygen concentration of the ambient air. As the quantity flowing through this module is large, this will be the case only when the $O_2$ concentration of the atmosphere in the storage chamber is low. Modules (3) and (4) produce a further lowering in the oxygen concentration of the retentate stream (F6) which leaves module (2). The outgoing $O_2$ concentration of the membrane unit stream is determined by the residence time or flow rate and this can be adjusted by means of a needle valve (6). The $O_2$ concentration obtained downstream of the last module in the stream which passes to the storage cheer (1) will fall depending on the $O_2$ concentration of the atmosphere in the storage chamber (1), while the quantity increases somewhat because the pressure in the system rises. Permeat stream (F3) provides an oxygen loop, which ensures that the $O_2$ concentration in the permeate from the first module remains high. By this means, the final value for the $O_2$ concentration in the atmosphere in the storage cheer is obtained at a low concentration. As a result of the recycling through the storage chamber and specifically as a result of the oxygen loop (F3), the time in which a storage chamber can be conditioned can be appreciably shortened.

What has been described above in respect of the oxygen concentration also applies in principle with respect to the carbon dioxide concentration in the atmosphere in the storage chamber (1). In this case also the major proportion of the $CO_2$ present is separated off via the first module (2). In addition, the difference compared with oxygen is that the separation factor for carbon dioxide versus nitrogen is appreciably higher than that for oxygen versus nitrogen, as a result of which the carbon dioxide concentration which leaves the membrane unit and passes to the storage chamber will be very low. The concentration of carbon dioxide which is present in the ambient air and is drawn in by the compressor (F2) is only 0.05%. Consequently, it is possible to obtain a virtually carbon dioxide-free storage chamber. Specifically, this $CO_2$ removal is virtually independent of the membrane setting.

By changing the membrane setting it is possible to obtain any desired oxygen concentration in the storage chamber (1), while the installation continues to remove carbon dioxide.

Advantageously, the $O_2$ content of the atmosphere in the storage chamber is brought to a value of less than 5% by volume, preferably to a value in the range from 1 to 2% by volume or of 0.5 to 1% by volume.

Membranes which can be used as the $N_2/O_2$ gas separation membranes to be used in the invention are all membranes disclosed in the prior art. Examples of such membranes are the Prism Alpha membrane (Permeat Inc. St. Louis, USA), the Generon membrane (Linde division Union Carbide Industrial Gases) and the poly(2,6-dimethyl-p-phenylene oxide) asymmetric hollow fibre membranes (EP-B-0,298,531).

ILLUSTRATIVE EMBODIMENT

Figure 1:
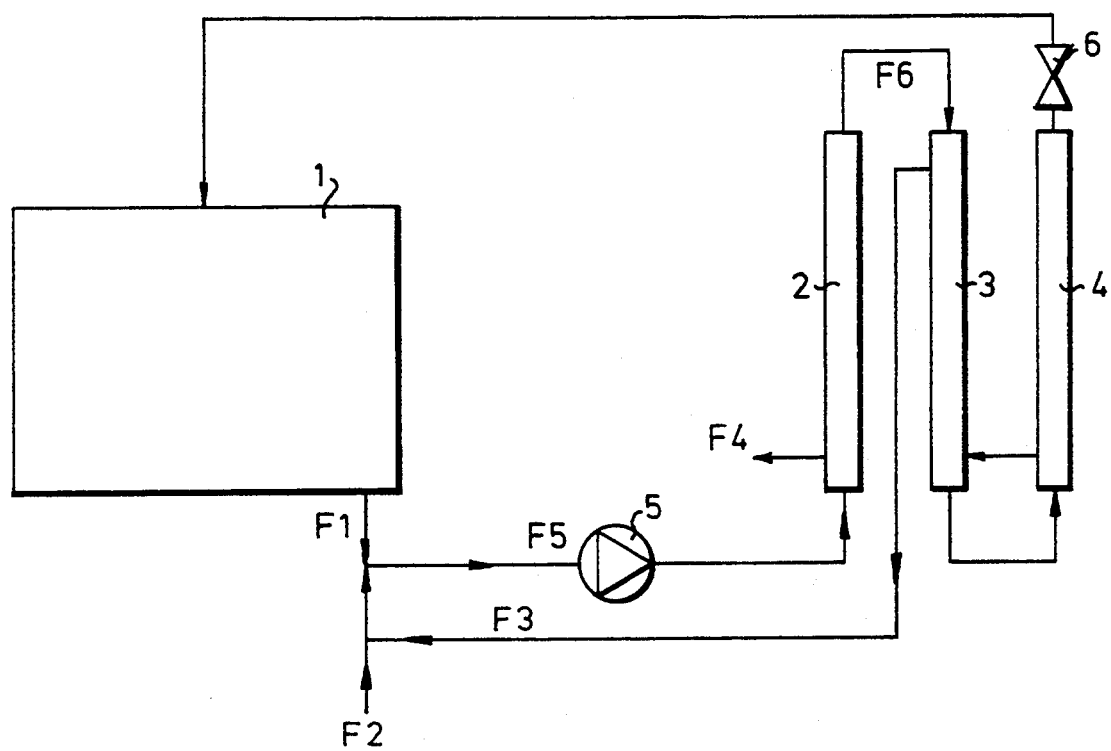
FIG. 1: shows, diagrammatically, a system according to the invention comprising:
- a storage chamber (1)
- three separation modules (2), (3) and (4), which are located downstream of one another and are provided with a $N_2/O_2$ separation membrane,
- a compressor (5) and
- a control valve (6), which components are connected to one another via the indicated lines.

A flow of 18,500 l/hour (F1) was withdrawn via a compressor (5) from a storage chamber (1), which was filled with 60 tones of apples and still had a free space of 225 m³. This compressor (5) drew in 13,800 l/hour of air via the outside air. The stream (F3), which originated from the second (3) and third (4) gas separation module, was 23,300 l/hour. The gas stream issuing from the compressor (5) was fed at a flow-through volume of 0.72 l into the first gas separation module (2), which was provided with a PPO membrane (poly(2,6-dimethyl-p-phenylene oxide) asymmetric hollow fibre membrane, skin thickness=0.2 μm; see EP-B-0,298,531) having a surface area of 13 m². The retentate from this first module was fed at a flow-through voluble of 0.72 l into the second gas separation module (3), which was provided with a PPO membrane (see above definition) having a surface area of 13 m². The retentate from the second module was then fed at a flow-through volume of 0.72 l into the third module (4), which, in turn, was provided with a PPO membrane (see above definition) having a surface area of 13 m². The retentate from this third module was returned via the needle valve (6) to the storage chamber (1).

Figure 2:
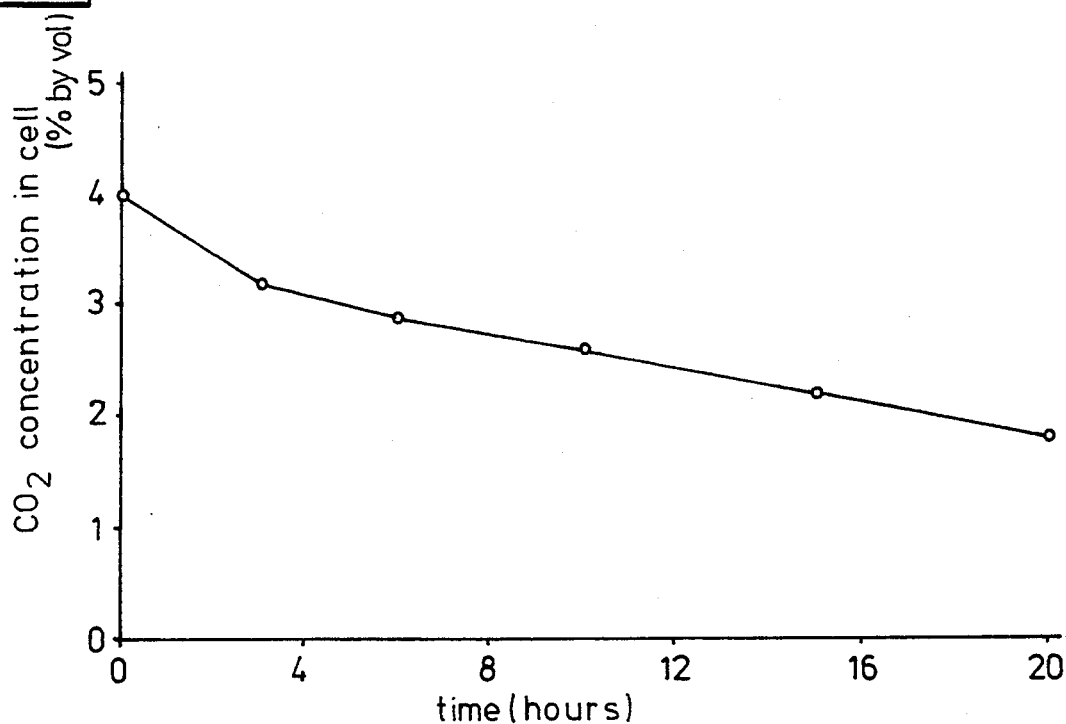
FIG. 2: shows a graph of the test results relating to $CO_2$ removal in a storage chamber which has a free space of 225 m³. The $CO_2$ concentration of the atmosphere in the storage chamber in % by volume is shown on the ordinate and the time in hours is shown on the abscissa.
Figure 3:
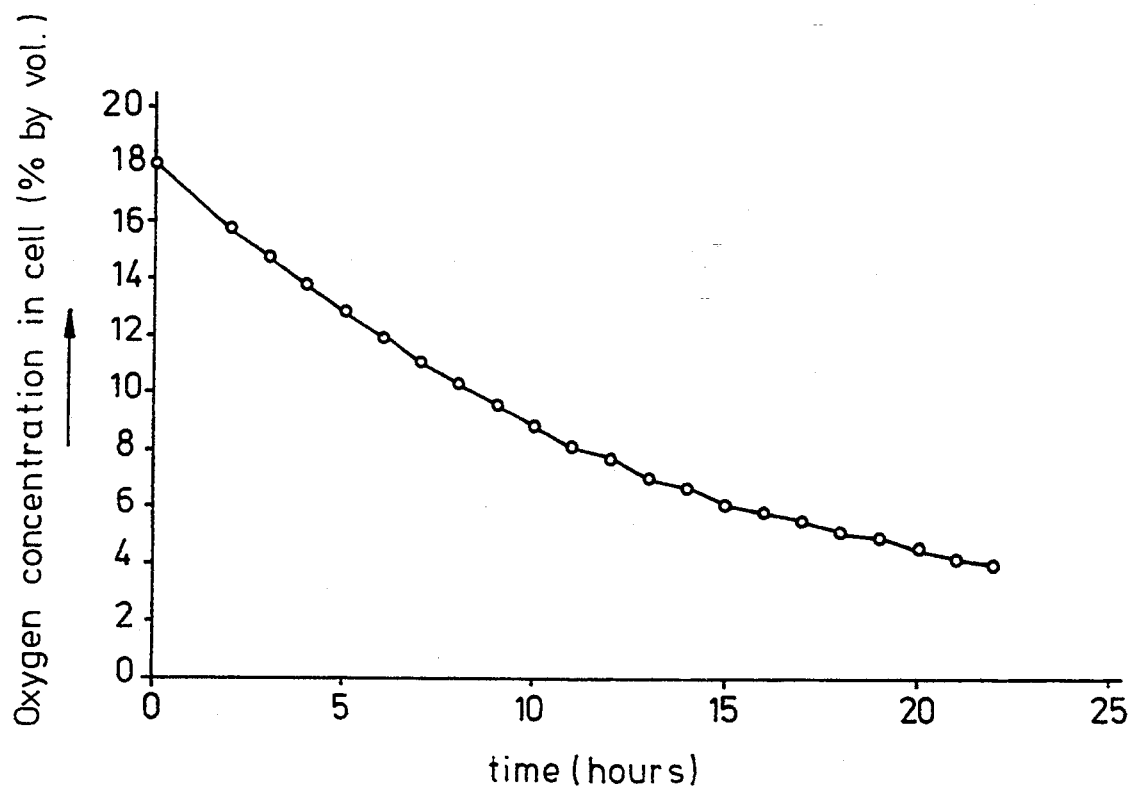
FIG. 3: shows a graph of the test results relating to $O_2$ removal in a storage chamber which has a free space of 225 m³. The $O_2$ concentration of the atmosphere in the storage chamber in % by volume is shown on the ordinate and the time in hours is shown on the abscissa.

The results relating to the atmosphere in the storage chamber (1), which were obtained at ambient temperature (20° C.), are shown in Table A below (and also in FIGS. 2 and 3).

TABLE A

| TIME (HOURS) | MEASURED CONC. $O_2$ | MEASURED CONC. $CO_2$ |
|---|---|---|
| 0 | 18.1 | 4 |
| 1 | | |
| 2 | 15.8 | |
| 3 | 14.8 | 3.2 |
| 4 | 13.8 | |
| 5 | 12.9 | |
| 6 | 12 | 2.9 |
| 7 | 11.1 | |
| 8 | 10.3 | |
| 9 | 9.6 | |
| 10 | 8.9 | 2.6 |
| 11 | 8.2 | |
| 12 | 7.8 | |
| 13 | 7.1 | |
| 14 | 6.7 | |
| 15 | 6.1 | |
| 16 | 5.8 | 2.2 |
| 17 | 5.5 | |
| 18 | 5.1 | |
| 19 | 4.9 | |
| 20 | 4.5 | 1.8 |
| 21 | 4.2 | |
| 22 | 3.9 | |

We claim:
1. A method for conditioning the atmosphere in a storage chamber containing organic harvested produce comprising the steps of:
   (a) storing organic harvested produce in a storage chamber under a first atmospheric condition;
   (b) drawing an atmospheric stream from the storage chamber;
   (c) drawing an air stream;
   (d) mixing said atmospheric stream and said air stream to provide a mixed stream;
   (e) feeding said mixed stream to a first separation module;
   (f) separating said mixed stream in said first separation module into a first permeate stream and a first retentate stream;
   (g) feeding said first retentate stream to a second separation module;
   (h) separating said first retentate stream in said second separation module into a second permeate stream and a second retentate stream;
   (i) feeding said second retentate stream to a third separation module;
   (j) separating said second retentate stream into a third permeate and a third retentate stream; and
   (k) passing said third retentate stream to said storage chamber so as to modify the first atmospheric condition.

2. A method according to claim 1 including the steps of admixing said second permeate stream and said third permeate stream with said atmospheric stream and said air stream in step (d) of claim 6.

3. A method according to claim 2 including the steps of repeating steps (e) through (k) of claim 6.

4. A method according to claim 2 including the steps of modifying said atmospheric condition in the storage chamber so as to maintain an $O_2$ content of less than 5% by volume.

5. A method according to claim 2 including the steps of modifying said atmospheric condition in the storage chamber so as to maintain an $O_2$ content of about 1–2% by volume.

6. A method according to claim 2 including the steps of modifying said atmospheric condition in the storage chamber so as to maintain an $O_2$ content of about 0.5–1.0% by volume.

7. A method according to claim 1 including the steps of providing a compressor for drawing said atmospheric stream and said air stream.

8. A method according to claim 7 including the steps of providing flow control means between said third separation module and said storage chamber.

* * * * *